United States Patent Office 2,835,971
Patented May 27, 1958

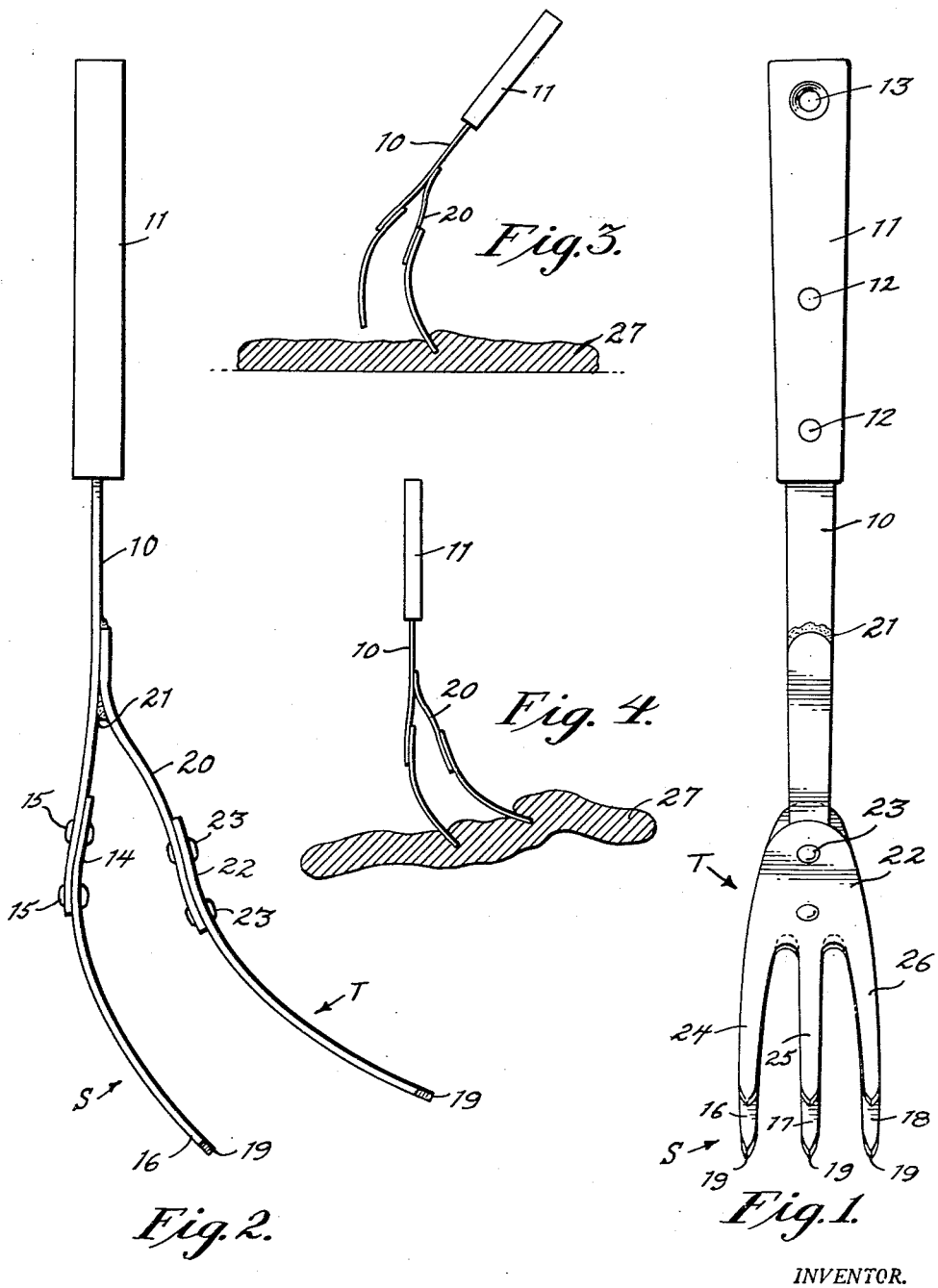

2,835,971

FORK

Frank W. Neuman, Lansdale, Pa.

Application March 22, 1956, Serial No. 573,207

2 Claims. (Cl. 30—322)

The present invention relates to forks, and is concerned primarily with that type of fork that is commonly used in conjunction with roasts of meat or fowl, or other cuts in large sizes.

At the present time, certain cuts of meat such as roasts are provided in relatively large sizes and have a substantial mass. This is equally true of various types of fowl. When the cook has occasion to remove a roast or a fowl from the pan, a fork is ordinarily employed. Such a fork must be capable of sustaining the entire weight of the particular piece being removed. In many instances, the engagement of the usual tines of a conventional fork is not sufficient to sustain the load, and this undesirable condition is emphasized when the meat is well-cooked. Thus, the cook experiences considerable difficulty in manipulating the meat or fowl in the desired manner, and often has to resort to two forks, the manipulation of which is an inconvenient and awkward proposition.

With the foregoing conditions in mind, the present invention has in view as its foremost objective the provision of a fork of the character indicated which includes two sets of tines that are laterally spaced apart. Thus, these two sets of tines complement one another to afford a good and secure anchorage in the meat.

More in detail, the invention has as an object the provision of a fork of the character indicated which consists essentially of a main arm, one end of which carries a handle. The other end of this arm carries a conventional fork in the form of a set of tines. Joined to this main arm and outstanding therefrom at an appropriate point is an auxiliary arm, the free end of which carries a second set of tines.

In accordance with the present invention, the tines of each set are of a curved construction. An important object of the invention is to arrange the set of tines on the auxiliary arm so that the points thereof will engage and penetrate the meat in advance of the points of the tines on the set carried by the main arm. This arrangement facilitates the penetrating action, and at the same time insures that the engagement of the two sets is properly co-related to provide the desired holding effect.

Another object of the invention is to provide, in a fork of the character indicated, an integral metallic joint between the auxiliary and main arms. This joint may be established by any metal fusion process, such as welding or soldering. Such a joint establishes the secure connection which is important if the tines are to sustain the load required thereof.

Yet another object of the invention is to provide, in a fork of the character indicated, two sets of tines, each of which is curved in separate planes, with the planes of curvature tending to converge toward the handle. This feature is tied up with that of having the points of the tines on the auxiliary arm in advance of those on the main arm.

Various other more detailed objects and advantages of the invention, such as arise in connection with carrying out the above noted ideas in a practical embodiment, will in part become apparent and in part be hereinafter stated as the description of the invention proceeds.

The invention therefore comprises a fork consisting of two sets of tines carried by a main arm and an auxiliary arm, with the two arms being joined to a common handle, and with the two sets of tines arranged in separate curved planes.

For a full and more complete understanding of the invention, reference may be had to the following description and accompanying drawing, wherein:

Figure 1 is a view in front elevation of a fork embodying the precepts of this invention.

Figure 2 is a side elevation taken normal to the showing of Figure 1.

Figure 3 is a side elevation showing the position of the fork relative to a piece of meat during the first step of penetration; and Figure 4 is a view similar to Figure 3, showing the second step of penetration.

Referring now to the drawing, wherein like reference characters denote corresponding parts, the fork of this invention is shown as including a main arm which is identified as 10. This arm may be of any appropriate metal, although the invention has particularly in mind the use of a good-quality steel. The arm 10 carries at one end a handle 11, which may be of wood, plastic, or any good heat-insulating material. The connection between the handle 11 and arm 10 is established in any preferred manner, such as by rivets shown at 12. Adjacent to its free end, the handle 11 is formed with an opening 13 for suspension purposes.

At the end remote from the handle 11, the arm 10 carries a set of tines, which is referred to in its entirety by the reference character S. This set of tines S comprises a back 14 that is joined to the arm 10, as by rivets 15, and three tines 16, 17, and 18. The tines 16, 17, and 18 are curved, as is clearly illustrated in Figure 2; and each is formed with a sharp point 19.

An auxiliary arm 20 is joined to the main arm 10 substantially midway thereof. This joinder may be effected in any preferred manner, although the invention has particularly in mind a fused metallic joint such as shown at 21. This joint at 21 may be established either by welding or soldering. Carried by the free arm of the auxiliary arm 20 is a second set of tines T. The tines T comprise a back 22, which is secured to the end of the auxiliary arm 20 in any preferred manner, as by rivets 23. Extending outwardly from the back 22 are three times 24, 25, and 26, each of which has a pointed end 19. The tines 24, 25, and 26 are also curved; and the curvature is such that the curved planes in which the tines of the sets S and T lie tend to converge towards the arm 10. It is notable that the points 19 of the tines in the set T are well in advance of the points 19 of the tines in the set S.

The manner of use is believed to be obvious. When a cook is desirous of removing a roast of meat, such as represented diagrammatically at 27 in Figures 3 and 4, from the roasting pan, the fork is manipulated so that the points 19 of the tines T first engage and penetrate the meat 27. After this penetration has been established to an appreciable degree, the points 19 of the set S then engage the meat, with penetration being continued by forcing of the both sets S and T thereinto.

It is evident that, with a piece of meat being engaged and penetrated by both sets of tines, torsional strains are amply resisted; and the tines of one set complement those of the other to establish a firm and secure anchorage of the fork in the meat.

While a preferred specific embodiment of the invention is hereinbefore set forth, it is to be clearly understood that the invention is not to be limited to the exact constructions, devices, and designs illustrated and described, because various modifications of these details may be provided in putting the invention into practice within the purview of the appended claims.

What is claimed is:

1. In a fork, a main arm of metal, a handle of heat-insulating material carried by said arm at one end thereof, a set of tines projecting from the other end of said arm and secured thereto, said set of tines lying in a single generally cylindrical surface having its axis of curvature transverse of the tines, an auxiliary arm of metal having one end secured to said main arm intermediate the ends thereof by a fused joint, said auxiliary arm extending from said main arm in oblique longitudinal outward relation thereto, a second set of tines secured to the free end of said auxiliary arm, said second set of tines lying in a second generally cylindrical surface having its axis of curvature transverse of said first and second sets of tines, the cylindrical surfaces of said first and second sets of tines converging in the direction toward said handle.

2. In a fork, a main arm of metal, a handle of heat-insulating material carried by said arm at one end thereof, a set of tines projecting from the other end of said arm and secured thereto, said set of tines lying in a single generally cylindrical surface having its axis of curvature transverse of the tines, an auxiliary arm of metal having one end fixedly secured to said main arm intermediate the ends thereof, said auxiliary arm extending from said main arm in oblique longitudinal outward relation thereto, a second set of tines secured to the free end of said auxiliary arm, said second set of tines lying in a second generally cylindrical surface having its axis of curvature transverse of said first and second sets of tines, the cylindrical surfaces of said first and second sets of tines converging in the direction toward said handle.

References Cited in the file of this patent

UNITED STATES PATENTS

| | | |
|---|---|---|
| D. 168,127 | Schoenfeld | Nov. 4, 1952 |
| D. 169,827 | Schoenfeld | June 9, 1953 |
| 1,768,425 | Smith | June 24, 1930 |
| 2,004,659 | Groch | July 11, 1935 |